United States Patent
Goodman

(10) Patent No.: US 8,301,765 B2
(45) Date of Patent: Oct. 30, 2012

(54) EVENT DETECTION AND RESPONSE USING RICH NETWORK CONTENT

(75) Inventor: William David Goodman, Collegeville, PA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 312 days.

(21) Appl. No.: 12/820,783

(22) Filed: Jun. 22, 2010

(65) Prior Publication Data

US 2011/0314144 A1 Dec. 22, 2011

(51) Int. Cl.
*G06F 15/173* (2006.01)
*H04W 4/00* (2009.01)
*H04W 40/00* (2009.01)
*H04B 7/212* (2006.01)

(52) U.S. Cl. .............. 709/224; 719/318; 455/435.1; 455/446; 370/338; 370/348

(58) Field of Classification Search .............. 709/224; 719/318; 455/435.1, 446; 370/338, 348
See application file for complete search history.

(56) References Cited

U.S. PATENT DOCUMENTS

| | | | |
|---|---|---|---|
| 7,123,918 B1 | 10/2006 | Goodman | |
| 7,247,024 B2 * | 7/2007 | Bright et al. | 434/130 |
| 7,289,811 B2 * | 10/2007 | Sawaya et al. | 455/446 |
| 7,480,508 B2 * | 1/2009 | Balachandran et al. | 455/435.1 |

OTHER PUBLICATIONS

"Parlay X", From Wikipedia, the free encyclopedia, http://en.wikipedia.org/wiki/Parlay_X , Apr. 19, 2010.

* cited by examiner

*Primary Examiner* — Wing Chan
*Assistant Examiner* — David X Yi

(57) ABSTRACT

A server device may receive a notification indicating that an event has occurred, where the notification specifies an area associated with the event. The server device may further send a request for network content in response to the notification; receive the network content for each of a group of user devices, where the network content includes a location for each of the group of user devices and incident information for each of the group of user devices; generate geo fence information based on the area associated with the event, the geo fence information including boundaries for a geo fence that surrounds the location of the event; generate state information, associated with the geo fence, for a user device, of the group of user devices, located within the boundaries for the geo fence, where the state information includes the location for the user device; and send, to another server device, the state information for the user device.

23 Claims, 10 Drawing Sheets

| ACTIVE USER DEVICE ID(s) | USER DEVICE TYPE | GRID LOCATION (X/Y) | NETWORK REGION (Cell) | VELOCITY (mph/ heading) | ACTIVITY | INCIDENT FLAG | TIME (hh:mm:ss) |
|---|---|---|---|---|---|---|---|
| IMSI - 103545687 | PDA - 04 | 4.234 / A.623 | 1 | 57 / NNE | TEXT | 0 | 15:35:05 |
| MDN - 8435551111 | MOBILE TELEPHONE | 9.012 / F.567 | 3 | 0 / S | CALL | 1 | 15:35:05 |
| MSISDN 2435 | LAPTOP COMPUTER | 6.095 / R.679 | 2 | 0 / -- | DATA | 0 | 15:35:31 |
| ... | ... | ... | ... | ... | ... | ... | ... |
| LDN - 8435552222 | LANDLINE TELEPHONE | 15.918 / B.396 | L | 0 / -- | NONE | 0 | 15:35:58 |

FIG. 7

| GEO FENCE 1010 | USER DEVICE TYPE 1020 | ACTIVE DEVICE QUANTITY 1030 | ACTIVITY LEVEL 1040 | QUANTITY IN CRITICAL ZONE 1050 | RELATIVE FLUX 1060 | INCIDENT QUANTITY 1070 | EVENT TIME (hh:mm:ss) 1080 |
|---|---|---|---|---|---|---|---|
| ABCD | MOBILE TELEPHONE | 5789 | HIGH | 18 | – | 76 | 15:35:05 |
| ABCD | PDA | 4398 | HIGH | 15 | – | 64 | 15:35:05 |
| ABCD | LAPTOP COMPUTER | 4071 | NOMINAL | 13 | – | 18 | 15:35:05 |
| ABCD | LANDLINE TELEPHONE | 5912 | NOMINAL | 2 | – | 84 | 15:35:05 |
| ABCD | TOTAL | 20170 | HIGH | 48 | – | 242 | 15:35:05 |

EVENT DETECTION AND RESPONSE USING RICH NETWORK CONTENT

BACKGROUND

Circuit-switched networks may provide a connection service that permitted user devices or network devices to communicate with each other by establishing a connection for the duration of the communication. When the communication was terminated, the communication service ended and any residual information resident on the network, on network devices, or on user devices was usually lost or automatically discarded. By contrast, today's packet-switched networks provide a variety of services, such as voice communications, electronic mail, instant messaging, Internet-based services, security, etc. Furthermore, in today's networks, when communications between user devices or network devices are terminated, the residual information on the network, on network devices, or on user devices can often remain on the network or can be stored in the network devices or the user devices. Unfortunately, despite the fact that the information on today's networks is not always lost or automatically discarded, the information is not always used by the network, the network devices, or the user devices.

BRIEF DESCRIPTION OF THE DRAWINGS

FIG. 7 is a diagram of an example user device state information table that is capable of being generated within an example portion of the network of FIG. 2;

FIG. 10 is a diagram of an example event-specific network state information table capable of being generated within an example portion of the network of FIG. 2.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may include systems and/or methods that provide for an implementation regarding event detection and response using rich network content (hereinafter referred to as "event detection and response").

More particularly, the event detection and response implementation may use an event detection and response application (hereinafter referred to as an "event application") to obtain rich network content (hereinafter referred to as "network content"), from a network, in order to detect whether a potential event has occurred and/or to assist local, state, or federal authorities (e.g., first responders, etc.) that are responding to a reported and/or actual event. In one implementation, the event application may use network content to identify acts or incidents associated with a user device to determine whether a potential event is detected. Additionally, or alternatively, the event application may generate a geographic fence to identify user devices that are located in the vicinity of, and/or potentially affected by, the event and/or to obtain network content to identify network conditions and/or circumstances before, during, and/or after an event. The event application may send the network content to authorities (e.g., local, state, federal, and/or other authorities) and/or first responders (e.g., police, medical personnel, firemen, etc.) to aid the authorities/first responders in responding to the event. The event application may also send instructions and/or information to a user device to aid a user, of the user device, if an event has occurred and/or if a potential event has been detected.

The term, "event," as described herein, may include an accident (e.g., a car accident, a train accident, etc.), a natural disaster (e.g., an earthquake, a flood, a weather event, etc.), a manmade disaster (e.g., a bridge collapse, a discharge of a hazardous material, an explosion, etc.), a security event (e.g., a terrorist attack, an act of war, etc.), and/or any other event that may trigger a response from authorities and/or first responders and/or may trigger a notification to a large quantity (e.g., greater than some threshold) of user devices (e.g., acts associated with a major sporting event or concert, election day coordination, traffic management due to road construction, etc.).

Figure 1:
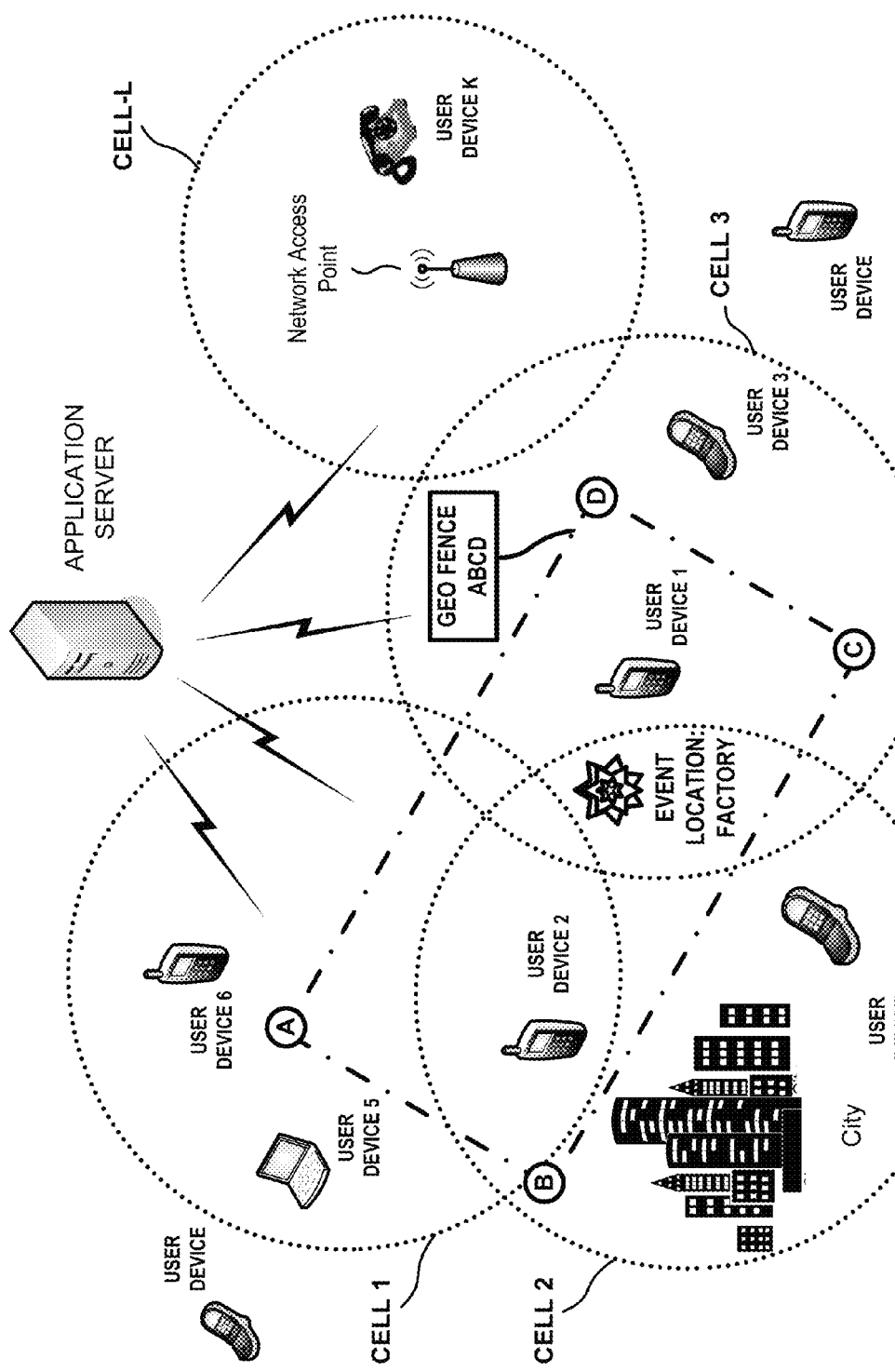
FIG. 1 is a diagram that illustrates an overview of an event detection and response implementation, using rich network content described herein.

FIG. 1 is a diagram that illustrates an overview of an event detection and response implementation described herein. As illustrated in FIG. 1, an application server may communicate with a set of user devices (e.g., user devices 1, 2, . . . , K) via network access points (e.g., a cell tower, landline, the Internet, etc.). The application server may receive network content information, such as presence information (e.g., a quantity of active user devices, identifier information associated with active user devices, types and/or versions of active user devices, etc.), location information associated with the active user devices, activity history information associated with active user devices, public advisory information (e.g., weather alerts, travel advisories, Amber alerts, civil defense alerts, etc.), and/or other information (e.g., information obtained from private or public websites, such as from video cameras, news wires, streaming media, 911 calls, geographic information systems, etc.).

Assume that there has been an explosion at a factory (e.g., shown as "Event Location: Factory" in FIG. 1). Assume further that cells 1, 2, . . . , L (hereinafter collectively referred to as "cells" and individually as a "cell") are located in the vicinity of the factory and that some or all of the user devices communicate with a network via the cells. The application server may host an event application that may receive network content information from the user devices and from other sources.

An operation to detect a potential event may be performed. For example, the event application may process the network content information to detect a potential event associated with the explosion at the factory and/or to provide information, associated with the event, to a server device associated with authorities. In one implementation, the event application may, for example, detect a series of 911 calls from one or more user devices. In another example, the event application may detect a 911 call originating from a particular geographic location at or near the factory (e.g., from user device 1 and/or user device 2 as shown in FIG. 1). In yet another example, the event application may detect a rapid change in user device activity level (e.g., above or below a particular activity level threshold) from the particular geographic location and/or from a particular cell (e.g., cell 3), or set of cells (e.g., cell 3, cell 2, cell 1, etc.) that intersects the particular geographic location of the factory. In still another example, the event application may detect a rapid increase in temperature (e.g., greater than a threshold) originating from a thermostat and/or another device that is capable of transmitting a signal containing temperature information associated with the factory. In yet another example, the event application may detect an increase in power consumption (e.g., greater than another threshold) from a heating, ventilation, and air conditioning (HVAC) system, located within the factory, that are capable of transmitting a signal indicating power consumption. The event application may detect the potential event and may report the potential event to authorities (e.g., local, state, and/or federal authorities).

An operation to generate a geographic fence (hereinafter referred to as a "geo fence") may be triggered when an event occurs. For example, the event application may receive an alert and/or a notification (e.g., a notification from a 911 dispatcher, messages received from users of user devices, a particular quantity or type of 911 call(s), an Amber alert, a weather bulletin, etc.) indicating that an event, or series of events, have been reported and/or have occurred. In another example, the event application may receive information that an event has occurred based on the detection of a potential event as described above.

The event application may use information associated with the type and/or characteristics of the event to generate the geo fence, or series of geo fences associated with the notification and/or the alert. For example, the parameters of the geo fence may be set based on the type of event (e.g., a one-car accident, severe flood, etc.), the quantity of user devices affected by the event, the location of affected user devices (e.g., on a highway, in a building, on a river, etc.), whether multiple events are involved and/or the proximity of the multiple events, the location of the event (e.g., urban, suburban, rural), the proximity of first responders, to match parameters associated with the notification (e.g., a weather advisory for a defined region), etc.

In the present case and as illustrated in FIG. 1, the event application may generate geo fence ABCD in response to the notification regarding the factory explosion and may establish parameters associated with geo fence ABCD based on the quantity of user devices in close proximity of the event location (e.g., user device 1 and 2), the cells involved (cells 1-3), the location of the user devices, the event's proximity to roads, bridges, population centers, etc.).

An operation to obtain network information, associated with the event and within the parameters of the geo fence, may be performed. For example, the event application may obtain network content information associated with the geo fence and may use the network content to identify acts, incidents, and/or circumstances associated with user devices located within the boundaries of the geo fence. The event application may send the network content associated with the geo fence and/or information associated with the identified acts, incidents, and/or circumstances to a server device associated authorities, first responders, etc. In another example, the event application may retrieve network content information from a prior point in time (e.g., before the geo fence was generated and/or prior to a point in time when the event occurred) and/or may process the retrieved network content, using the geo fence, to identify acts, incidents, and/or circumstances associated with user devices, located within the boundaries of the geo fence, at the prior point in time. The event application may send the processed network content information and/or the identified acts, incidents and/or circumstances to the server device associated with authorities, first responders, etc.

Authorities and/or first responders may use information, received from the event application, to investigate and/or respond to a potential event and/or an actual or reported event. For example, the event application may send information, regarding an act, and incident and/or circumstances and/or a series of acts, incidents and/or circumstances, associated with a potential event, to authorities and/or first responders. In one example, the event application may detect an incident associated with a user device or set of user devices that were potentially involved in or affected by an automobile accident and my send information associated the user device or set of user devices (e.g., location information, quantity of user devices, etc.) to authorities and/or first responders. The authorities and/or first responders may use the information, associated with the user device or set of user devices, to investigate whether an actual event (e.g., an actual car accident) has occurred at or near the location identified in the location information. In another example, the event application may send information, associated with user devices located within a geo fence established in response to a reported event, to first responders. In this example, the event application may send, to authorities and/or first responders, location information, associated with user devices located within a factory before and after a point in time that an explosion occurred at the factory, to assist the authorities and/or first responders in determine a quantity of users (e.g., users of user devices) that potentially evacuated the factory and/or another quantity of users that may still be within the factory. In yet another example, the event application may send information and/or instructions to user devices that may be located within the geo fence and/or may be affected by an event that may assist the users, of the user devices, to avoid and/or evacuate the area where the event occurred.

Figure 2:
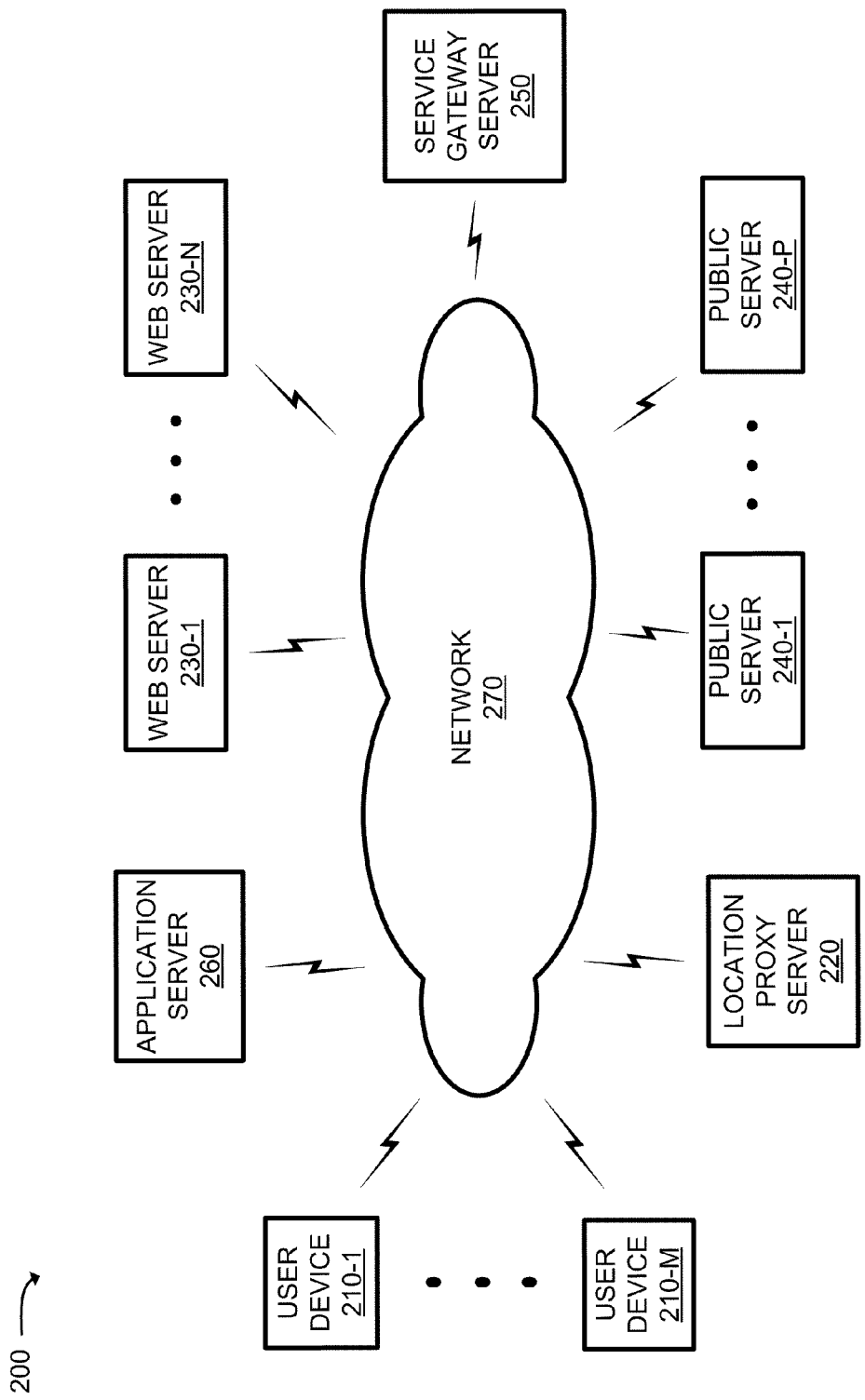
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include user devices 210-1, . . . , 210-M (where M≧1) (hereinafter referred to collectively as "user devices 210" and individually as "user device 210"), a location proxy server 220, web servers 230-1, . . . , 230-N (where N≧1) (hereinafter referred to collectively as "web servers 230" and individually as "web server 230"), public servers 240-1, . . . , 240-P (where P≧1) (hereinafter referred to collectively as "public servers 240" and individually as "public server 240"), a service gateway server 250, an application server 260, and network 270. The number of devices, illustrated in FIG. 2, is provided for explanatory purposes only. In practice, there may be additional devices, fewer devices, different devices, or differently arranged devices than illustrated in FIG. 2.

Also, in some implementations, one or more of the devices of network 200 may perform one or more functions described as being performed by another one or more of the devices of network 200. For example, location proxy server 220, service gateway server 250, and/or application server 260 may be integrated into a single device. Devices of network 200 may interconnect via wired connections, wireless connections, or a combination of wired and wireless connections.

User device 210 may include any computation or communication device, such as a wireless mobile communication device that is capable of communicating via network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a STB, a television, a camera, a personal gaming system, or another type of computation or communication device, such as a 4G device (e.g., a thermostat, an appliance, a sensor, an HVAC device, and/or some other 4G device that is capable of communicating with location proxy server 220, service gateway server 250 and/or application server 260).

User device 210 may be associated with unique user device identification information that enables location proxy server 220, service gateway server 250, and/or application server 260 to distinguish user device 210 from other user devices 210. The user device identification information may include, for example, a private identifier (e.g., an international mobile subscriber identity (IMSI), a national access identifier (NAI), etc.), a public identifier (e.g., a mobile device number (MDN), landline device number (LDN), mobile subscriber integrated services digital network (MSISDN), etc.), an Internet protocol (IP) address, etc.

User device 210 may communicate with location proxy server 220 via short messaging protocols (e.g., SMS), IP protocols (e.g., TCP/IP, IPv4, IPv6, etc.) and/or other protocols. In one implementation, user device 210 may include a global positioning satellite (GPS) component that includes a GPS receiver that permits user device 210 to receive GPS signals (e.g., from an orbiting GPS satellite constellation) and to use the GPS signals to generate location information (e.g., latitude, longitude, elevation, speed, direction, etc.) that is geographically relative to the surface of the earth (e.g., geo location). In another implementation, user device 210 may generate geo location information using a component other than a GPS component. In yet another implementation, user device 210 may include a component (e.g., an accelerometer, compass, and/or some other component) that may generate a signal that includes information associated with the manner in which user device 210 is moving (e.g., in a straight line, at constant speed, changing in speed and/or changing direction). For example, the component may generate a signal that indicates whether a user device is rapidly accelerating (e.g., changing in speed or direction that exceeds some threshold).

User device 210 may store information in a memory associated with user device 210, may periodically send and/or stream information to another network device (e.g., location proxy server 220, service gateway server 250, etc.), and/or may send the information to the other network device in response to a query (e.g., from location proxy server 220, service gateway server 250, etc.).

The description to follow will generally refer to user device 210 as a wireless mobile communication device. The description is not limited, however, to a wireless mobile communication device and may equally apply to other types of user devices.

Location proxy server 220 may include one or more server devices, or other types of computation or communication devices, that gather, process, search, store, and/or provide information in a manner similar to that described herein. For example, location proxy server 220 may store functional components, such as application programming interfaces (APIs), in a memory (e.g., a memory associated with location proxy server 220), that enable location proxy server 220 to communicate with different types of user devices 210, different versions of a particular type of user device 210, and/or user devices 210 that use different protocols with which to communicate. Location proxy server 220 may include a privacy engine that governs access to and/or use of some or all information associated with user device 210, such as presence information, location information, call/browser/email/text history, information associated with applications (e.g., calendars, address books, email, etc.), based on permissions and/or preferences specified by a user of user device 210. Location proxy server 220 may use the APIs to communicate with user devices 210 to obtain presence information, location information, and/or other information associated with user devices 210. In one implementation, the location information may include coordinates (e.g., latitude and/or longitude), elevation information (e.g., distance above sea level), speed, heading, acceleration, etc. In another implementation, location proxy server 220 may receive coordinates associate with user device 210 and may compute speed, acceleration, heading, etc. using coordinates obtained over a particular period of time. Location proxy server 220 may use the APIs to convert the presence information and/or location information, obtained from user device 210, to a particular protocol (e.g., a mobile location protocol (MLP)) and may send the obtained information to service gateway server 250. Location proxy server 220 may use information, associated with user device 210 capabilities and/or configurations, to configure and/or format information sent to user device 210 (e.g., evacuation instructions for users located within a factory in which an event has occurred, traffic information, warnings, streaming media, etc.) in a manner that enables user device 210 to receive and/or process the received information.

Web server 230 may include one or more server devices, or other types of computation or communication devices, that gather, process, search, store, and/or provide information in a manner similar to that described herein. For example, web server 230 may host a website that permits access to a particular service, application, and/or information that may be used to detect an event, respond to an event, or perform an operation associated with detecting and/or responding to an event. For example, web server 230 may provide mapping information and/or geographical information associated with a particular region within which a potential event has been detected and/or an event has occurred. In another example, web server 230 may provide information associated with weather alerts, weather forecasts, weather radar information, etc. In still another example, web server 230 may provide information (e.g., images, streaming media, etc.) from new sources, news wires, etc. associated with a particular event. In yet another example, web server 230 may provide information associated with user device capabilities and/or configurations as a function of the type of user device 210 (e.g., cellular telephone, PDA, laptop computer, etc.) and/or model/version of a particular type of user device 210 (e.g., a particular model and/or version of PDA, such as a Palm Treo® 755, Apple iPhone®, etc.). The information associated with user device 210 capabilities and/or configurations may permit information and/or data associated with an event, that is sent to a user device 210, to be configured in a manner that enables user device 210 to receive and process the received information (e.g., instructions, traffic information, evacuation routes, warnings, alerts, streaming media, etc.).

Public server 240 may include one or more server devices, or other types of computation or communication devices, that gather, process, search, store, and/or provide information in a manner similar to that described herein. For example, public server 240 may host a website and/or provide a service that permits access to publicly available information, applications, and/or data, such as from a local, a state, and/or a federal agency (e.g., local or state police, the Federal Bureau of Investigation, the United States Department of Homeland Security, etc.), that may be used by the event application to identify whether an event has occurred and/or to trigger an operation to generate a geo fence, to obtain event-specific network content information, etc. Public server 240 may provide access to information associated with 911 dispatches, Amber alerts, weather alerts, civil defense alerts, etc.

Service gateway server 250 may include one or more server devices, or other types of computation or communication devices, that gather, process, search, store, and/or provide information in a manner similar to that described herein. For example, service gateway server 250 may include a server device that stores, in a memory associated with service gateway server 250, a group of service-specific functional components (e.g., service-specific APIs) that enable service gateway server 250 to communicate with different components of network 200, such as location proxy server 220, web server 230, public server 240, and/or application server 260, using a variety of protocols. In another example, service gateway server 250 may communicate with other service gateway servers 250 associated with other networks (e.g., networks other than network 200).

Service gateway server 250 may communicate with other network devices, for example, by performing queries to obtain information. In another example, service gateway server may subscribe to a service, associated with another network device, which may permit service gateway server 250 to receive information periodically and/or upon the occurrence of some event, from the other network device (e.g., notifications when an event has occurred, etc.). In yet another example, service gateway server 250 may subscribe to a service that provides streaming media (e.g., text, video, voice, data, etc.). In still another example, service gateway server 250 may receive information, from another network device, when the other network device sends (e.g., pushes) information to service gateway server 250.

Service gateway server 250 may use a particular API to communicate with location proxy server 220, using a particular protocol (e.g., MLP and/or other protocols), to receive location information, presence information, user device identification information, etc. For example, service gateway server 250 may use one or more other APIs to communicate with web server 230 and/or public server 240 to access services, applications, and/or information that may be used to detect an event, respond to an event, and/or perform an operation associated with detecting and/or responding to the event. Service gateway server 250 may convert the information obtained, using the service-specific APIs, from location proxy server 220, web server 230, and/or public server 240 to normalized network content based on a set of normalized protocols (e.g., for handling messaging, location information, user device identification information, presence information, multimedia messaging, device capabilities information, streaming media, geographic data, etc.). Service gateway server 250 may send the normalized network content, using the set of normalized protocols, to application server 260.

Application server 260 may include one or more server devices, or other types of computation or communication devices, that gather, process, search, store, and/or provide information in a manner similar to that described herein. For example, application server 260 may include a server device that hosts an event application that performs operations associated with detecting potential events and/or responding to events. Application server 260 may receive normalized network content that was sent from service gateway server 250 periodically, upon the occurrence of some event, and/or in response to a query sent by application server 260. Application server 260 may process the received normalized network content using a set of normalized functional components (e.g., normalized APIs) stored in a memory associated with application server 260 (e.g., Parlay X (numerous APIs), JAVA APIs, OpenGL (graphics), OpenAL (sound), OpenCL (computing, Web API, etc.), and/or other types of APIs) to process the normalized network content (e.g., to create network content information). Application server 260 may use the network content information to perform operations associated with detecting potential events and/or responding to potential events. From the network content information, application server 260 may generate state information and may use the state information to determine whether a potential event can be detected. In another implementation, application server 260 may, upon the occurrence of some event (e.g., a notification that an event has occurred), use the network content information to generate a geo fence from which event-specific device state information and/or network state information may be generated.

Network 270 may include one or more wired and/or wireless networks. For example, network 270 may include a cellular network, the Public Land Mobile Network (PLMN), and/or a 2G, a 3G, 4G, 5G and/or another network. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network (e.g., a fiber optic service (FiOS) network), and/or a combination of these or other types of networks.

Although not shown in FIG. 2, network 200 may include a variety of other devices, such as an authentication server, a self-provisioning server, etc. Each of these devices may perform certain functions described briefly below. Any of these functions may be performed by location proxy server 220, service gateway server 250, and/or application server 260. Thus, one or more of these devices may be integrated into location proxy server 220, service gateway server 250, and/or application server 260.

The authentication server may include one or more server devices, or other types of computation or communication devices, that authenticates user device 210. For example, the authentication server may receive a request to authenticate user device 210 based on information associated with a user of user device 210 (e.g., username, password, email address, PIN, etc.), and/or information associated with user device 210 (e.g., an identifier associated with user device 210).

The self-provisioning server may include one or more server devices, or other types of computation or communication devices that enable the registration of user device 210. The self-provisioning server may receive identification information from user device 210 and/or location proxy server 220. The self-provisioning server may facilitate sending address information, associated with location proxy server 220, service gateway server 250, and/or application server 260, to user device 210 and/or may forward user device identification information, associated with user device 210, to location proxy server 220, service gateway server 250, and/or application server 260.

Figure 3:
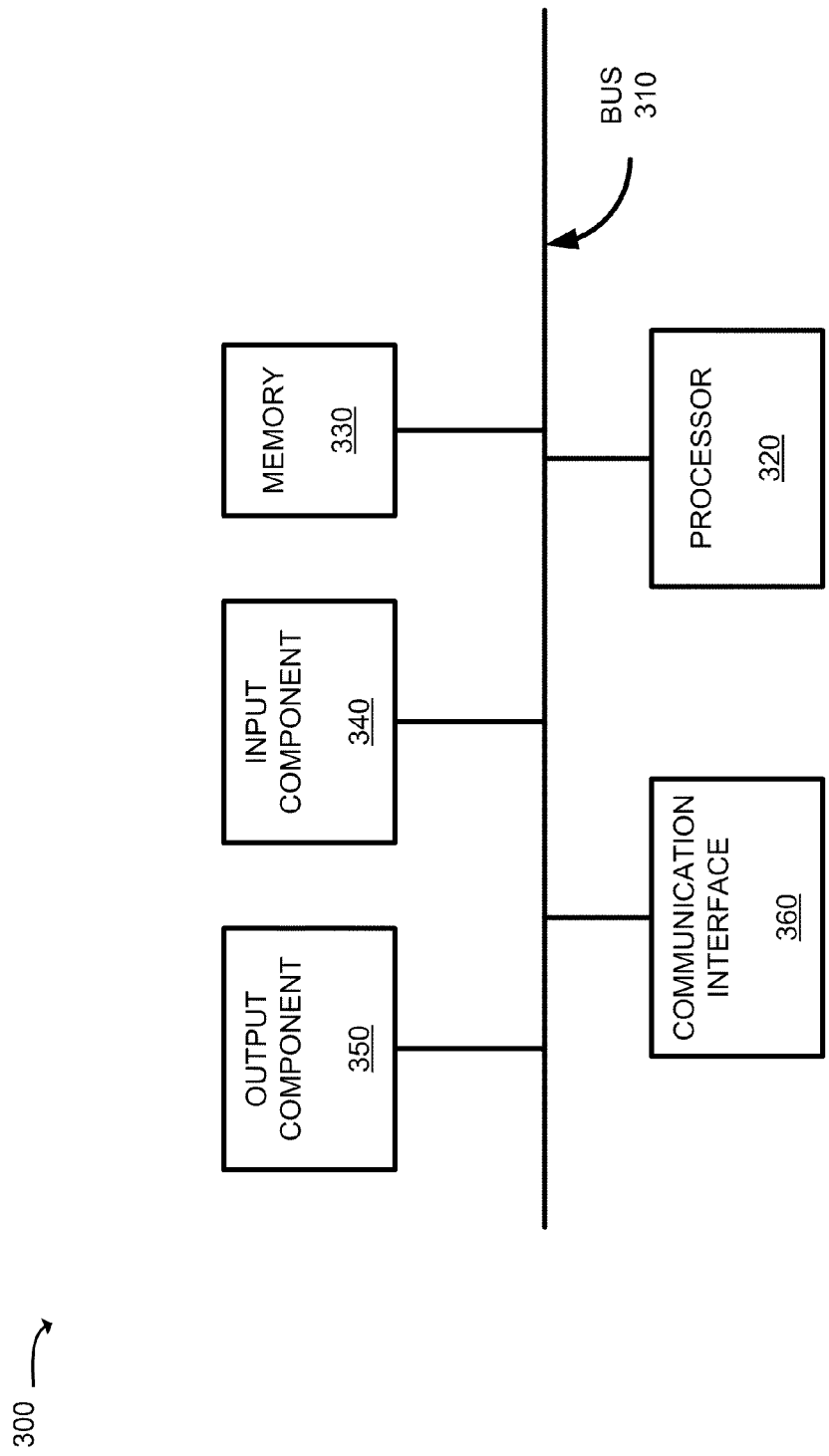
FIG. 3 is a diagram of example components of one or more of the devices of FIG. 2.

FIG. 3 is a diagram of example components of a device 300. Device 300 may correspond to location proxy server 220, web server 230, public server 240, service gateway server 250, and/or application server 260. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 270.

As will be described in detail below, device 300 may perform certain operations relating to the event detection and response. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
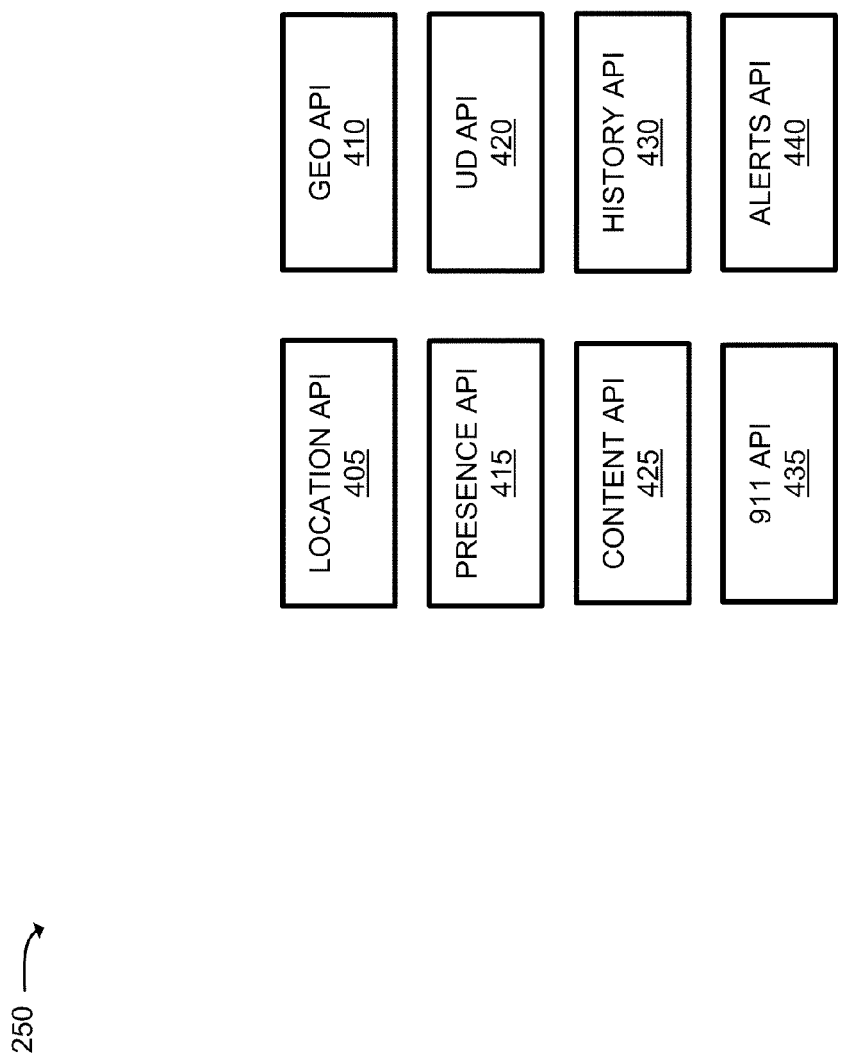
FIG. 4 is a diagram of example functional components associated with a service gateway server of FIG. 2.

FIG. 4 is a diagram of example functional components that may be associated with service gateway server 250 of FIG. 2. As illustrated, service gateway server 250 may include a location API 405, a geographic (GEO) API 410, a presence API 415, a user device (UD) API 420, a content API 425, a history API 430, a 911 API 435, and/or an alerts API 440. The number of functional components, illustrated in FIG. 4, is provided for explanatory purposes only. In practice, service gateway server 250 may be associated with fewer functional components, additional functional components, different functional components, or differently arranged functional components than are described with respect to FIG. 4. Moreover, one or more APIs in FIG. 4 may perform one or more functions described as being performed by another one or more of the APIs of FIG. 4. Also, the functional components in FIG. 4 may be implemented using one or more of the components in FIG. 3, such as processor 320.

Location API 405 may convert location information, from a particular service-specific protocol (e.g. a location information protocol used by a particular user device 210), to a normalized location information protocol that permits application server 260, with the permission of a user of user device 210 and using a normalized location API, to process the location information for the event application. GEO API 410 may convert geographical information (e.g., geographical information system (GIS) data, mapping information, digital terrain data, etc.) from a particular service-specific protocol (e.g. a geo information protocol used by a particular web server 230 and/or public server 240) to a normalized geo information protocol that permits application server 260, using a normalized GEO API, to process the geo information. Presence API 415 may convert presence information, received from user device 210 and/or from location proxy server 220, to a normalized presence information protocol that permits application server 260, using a normalized presence API, to process the presence information.

UD API 420 may convert user device capability and/or configuration information (e.g., a user device with a particular model, type, version, etc.), received from a particular user device 210 and/or location proxy server 220, to a normalized user device configuration protocol that can be used by application server 260. Content API 425 may, with the permission of a user of user device 210 and/or as permitted by applicable laws, permit network content such as message content, video content, image content, audio/voice content, call content, browsing content and/or other network content to be uploaded to the network so that an operation may be performed on the uploaded network content. The operation on the uploaded network content may include, for example, distributing streaming media associated with an event (e.g., video, audio, text, images, etc.), detecting particular content signatures associated with an event, such as key words, key faces (e.g., using facial recognition to identify a missing person, a fugitive, etc.), key sounds (e.g., using audio signatures to detect an explosion, a particular voice, a gunshot, etc.), key locations (e.g., using visual signatures to identify a location associated with an event, etc.), and/or other operations. Additionally, or alternatively, content API 425 may permit third party content to be downloaded (e.g., received from a third party content provider, such as web server 230 and/or public server 240) and/or stored by service gateway server 250 for use by application server 260. History API 430 may, with the permission of a user, permit call history information (and/or history information associated with text messaging, Internet browsing history, etc.), associated with a particular user device 210, to be uploaded, to be stored by service gateway server 250, and/or to be converted to a normalized call history protocol that can be used by application server 260. 911 API 435 may permit 911 dispatch information, associated with a particular public server 240, to be uploaded, to be stored by service gateway server 250, and/or to be converted to a normalized 911 protocol that can be used by application server 260. Alerts API 440 may permit certain alert information (e.g., civil defense alerts, Amber alerts, tornado warnings, storm warnings, flash flood warnings, hurricane warnings, hazardous material discharge warnings, etc.), associated with web server 230 and/or public server 240, to be received, to be stored by service gateway server 250, and/or to be converted to a normalized alert protocol that can be used by application server 260.

Figure 5:
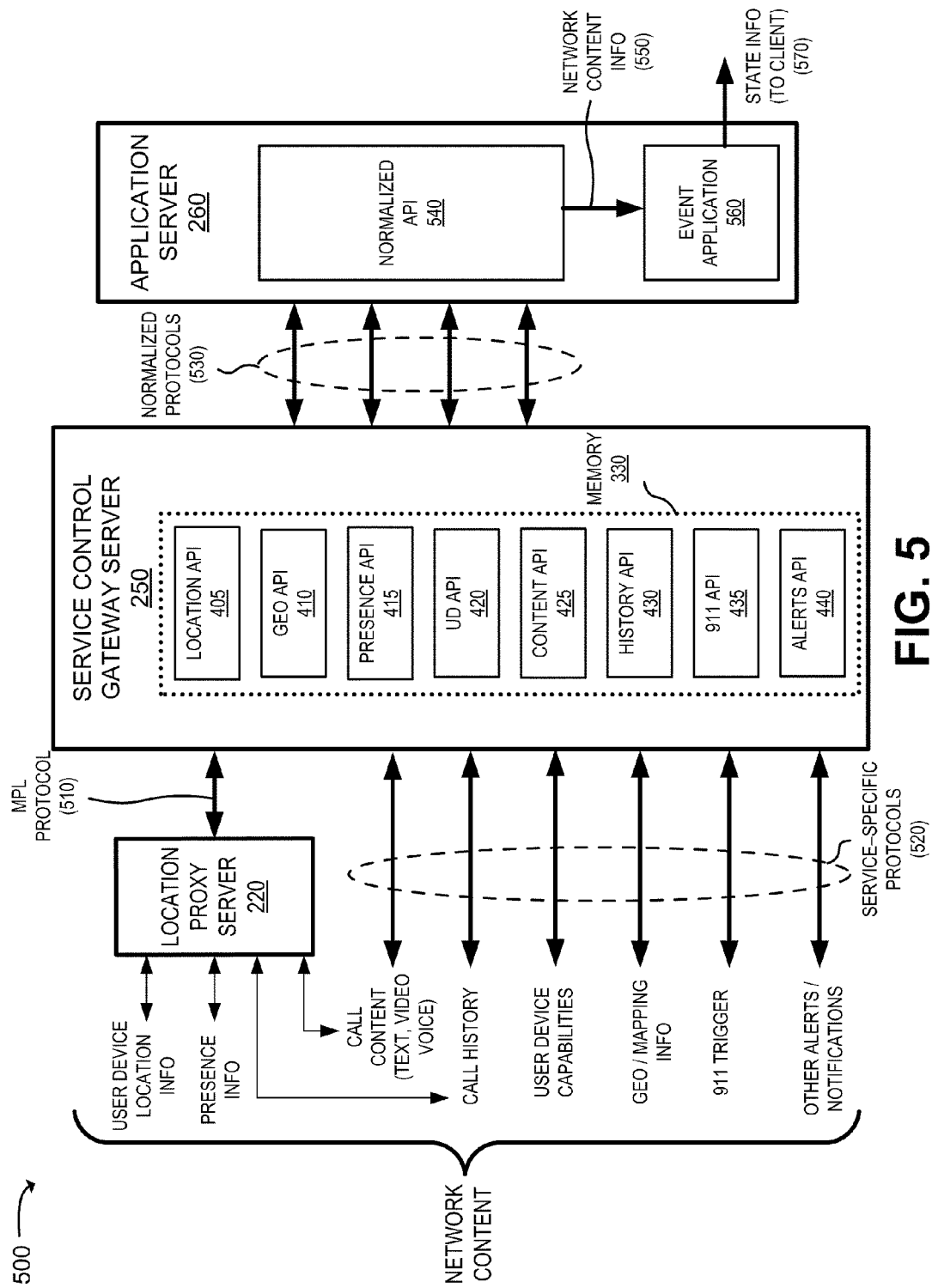
FIG. 5 is a diagram of an example interactions between a service gateway server interconnected with an application server of FIG. 2.

FIG. 5 is a diagram of an example interaction 500 between service gateway server 250 and application server 260. As illustrated in FIG. 5, service gateway server 250 may receive network content, may process the network content and may send the processed network content (e.g., as normalized network content) to application server 260. For example, service gateway server 250 may receive network content that is sent from location proxy server 220 periodically, upon the occurrence of some event, and/or in response to a query via one or more APIs described above in FIG. 4. The network content may include user device location information, presence information, user device identification information, and/or other information associated with user devices 210. The received network content may have been transmitted, for example, by location proxy server 220, using a service-specific protocol (e.g., mobility location protocol (MLP) protocol 510 and/or other service-specific protocols). It should be understood that some network content information, such as location information, may be received, processed, and/or transmitted with the permission of a user of user device 210 and/or as authorized under local, state, and/or federal law.

Other network content may be received from other network devices. For example, service gateway server 250 may receive other network content (e.g., call content information, geo information, user device capability information, call history information, etc.) that is sent from other network devices (e.g., web servers 230, public servers 240, etc.) periodically, upon the occurrence of some event, and/or in response to a query via one or more APIs described above in FIG. 4. The network content may be transmitted using a variety of service-specific protocols 520. Service gateway server 250 may receive the network content and may process the network content using APIs 405-440, in a manner similar to that described above with respect to FIG. 4. Service gateway server 250 may send the processed network content, as normalized network content, to application server 260 using normalized protocols 530 as described above with respect to FIG. 4. It should be understood, as described above, that some network content information, such as call content information, history information, may be received, processed, and/or transmitted with the permission of a user of user device 210 and/or as authorized under local, state and/or federal law.

Normalized network content may be received, may be processed, and may be used to generate state information. For example, application server 260 may receive the normalized network content and may use normalized API 540 to generate network content information 550 for use by event application 560. In this example, API 540 may include an API, or set of APIs 260 (e.g., Parlay X, JAVA APIs, OpenGL (graphics), OpenAL (sound), OpenCL (computing), Web API, etc.) that can process the normalized network content into network content information that event application 560 can use to generate state information, such as user device state information and/or network state information. Event application 560 may use the state information to perform operations associated with detecting potential events, creating a logical geo fence, and/or responding to reported and/or actual events.

Figure 6:
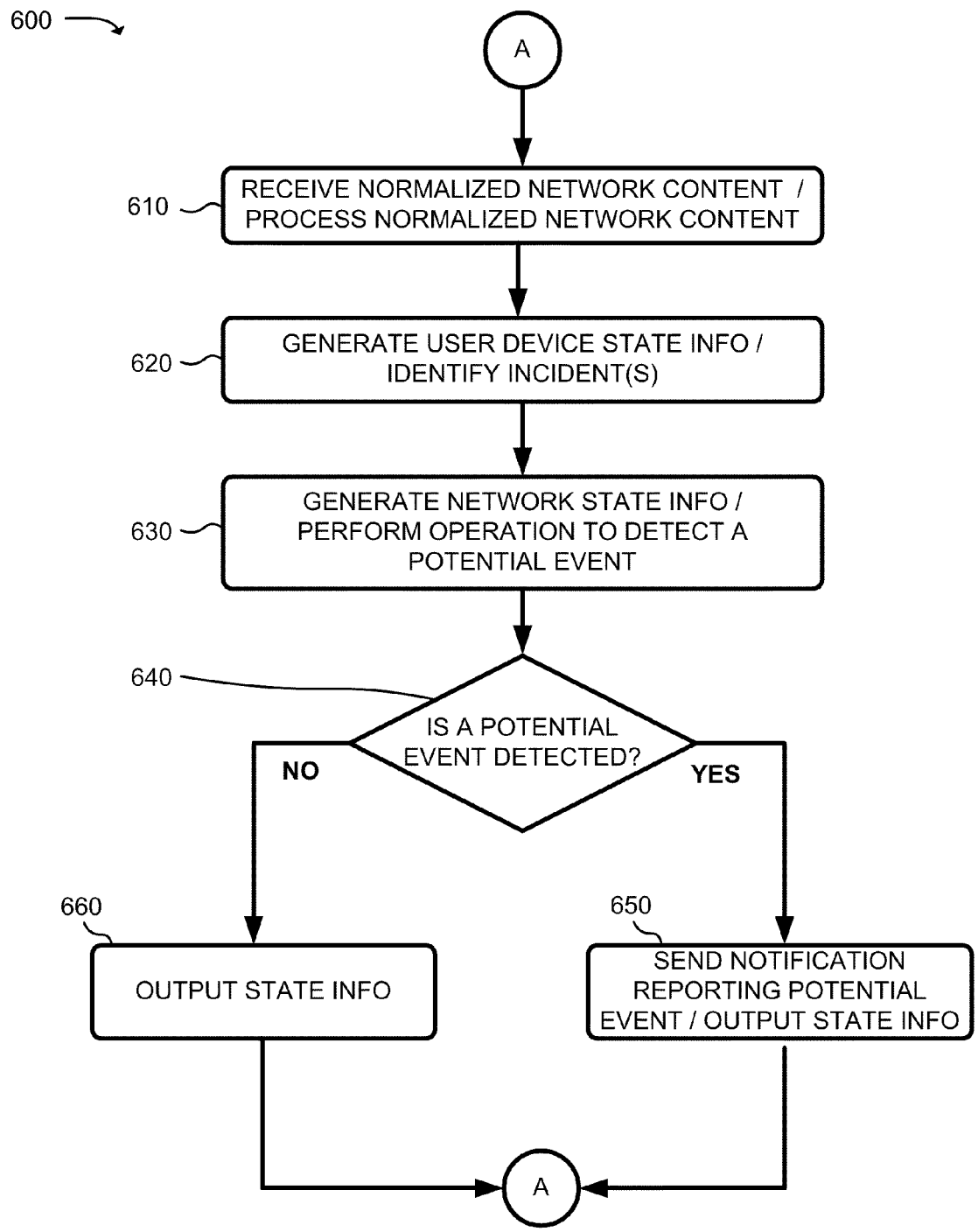
FIG. 6 is a flowchart of an example process for determining whether a potential event exists within an example portion of the network of FIG. 2.
Figure 8:
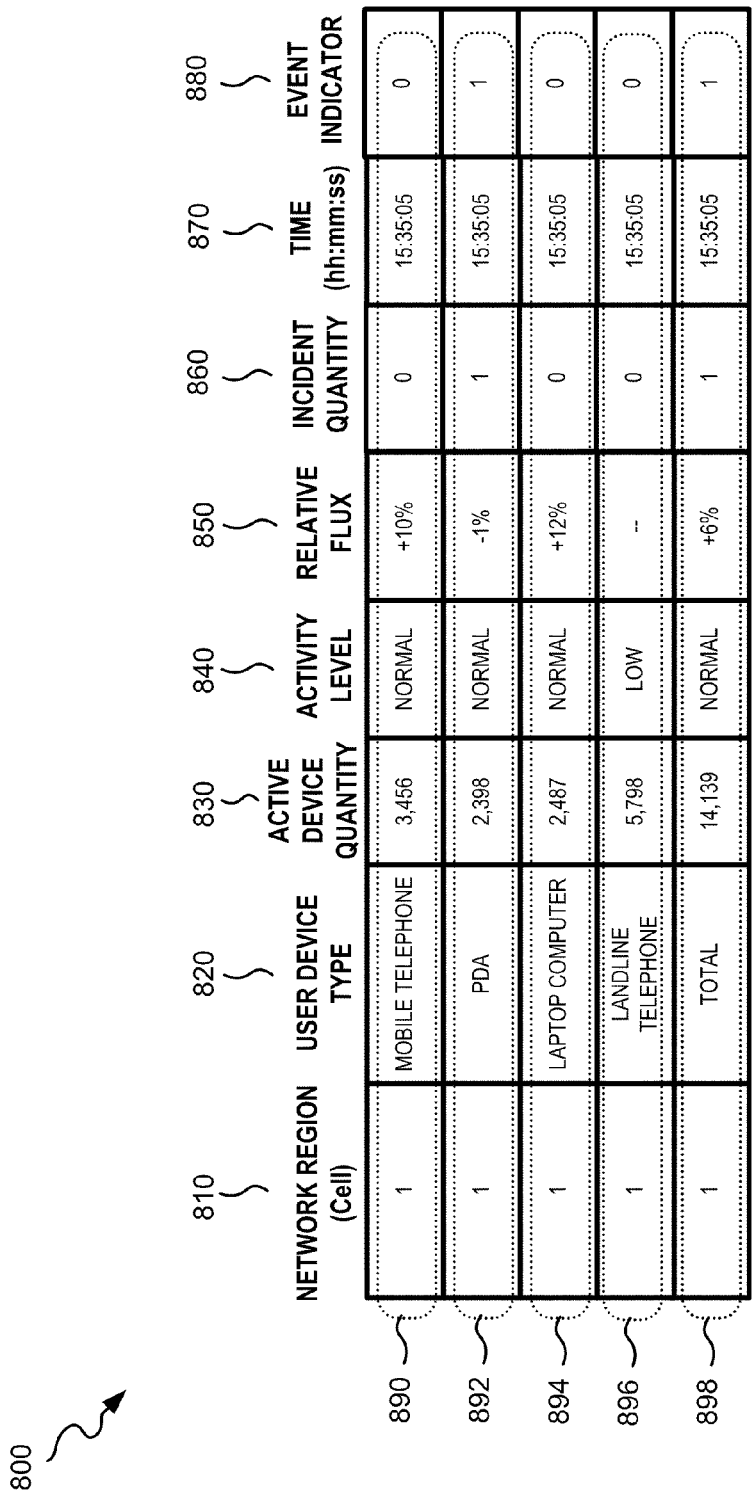
FIG. 8 is a diagram of an example instantaneous network state information table that is capable of being generated within an example portion of the network of FIG. 2.

FIG. 6 is a flowchart of an example process 600 for determining whether a potential event exists within an example portion of network 200 (FIG. 2). In one implementation, process 600 may be performed by application server 260. In another implementation, some or all of process 600 may be performed by a device or collection of devices separate from, or in combination with, application server 260. FIG. 7 is a diagram of an example user device state information table 700 that is capable of being generated within an example portion of network 200 (FIG. 2). FIG. 8 is a diagram of an example network state information table 800 that is capable of being generated within an example portion of network 200 (FIG. 2). A portion of process 600, of FIG. 6, will be discussed below with corresponding references to user device state information table 700 shown in FIG. 7 and network state information table 800 of FIG. 8.

Process 600, of FIG. 6, may include receiving normalized network content and processing the normalized network content (block 610). For example, service gateway server 250 may receive network content transmitted by other network devices (e.g., location proxy server 220, web server 230, public server 240, etc.). The network content may include presence information, location information, call content information, geographic information and/or mapping information, user device capabilities information, call history information, 911 information, and/or information associated with other alerts or notifications. Service gateway server 250 may process the network content, using a set of service-specific APIs (e.g., APIs 405-440 of FIG. 4) stored in a memory associated with service gateway server 250, and may send normalized network content to application server 260. Application server 260 may receive the normalized network content and may process the normalized network content, using a normalized set of APIs (e.g., normalized API 510 of FIG. 5), to create network content information for use by event application 560 in a manner similar to that described above (with respect to FIG. 5).

Process 600 may also include generating user device state information and identifying incidents (block 620). For example, event application 560 may generate user device state information (e.g., user device state information table 700 of FIG. 7) using the network content information received from service gateway server 250. For example, as illustrated in FIG. 7, user device state information table 700 may include an active user device identifier field (IDs) 710, a user device type field 720, a grid location field 730, a network region field 740, a velocity field 750, an activity field 760, an incident flag field 770, and/or a time field 780. While FIG. 7 illustrates user device state information table 700, that includes certain fields, such as fields 710-780, in another implementation, a user device state information table 700 may include fewer fields, additional fields, different fields or differently arranged fields than are described with respect to FIG. 7.

Active user device IDs field 710 may store user device identification information for a particular user device 210 that is powered up and able to communicate with network 270 (e.g., an active user device 210). User device type field 720 may store information associated with a type and/or version of the particular user device 210 (e.g., cell phone, a PDA, a laptop computer, a landline, etc.). Grid location field 730 may store location information associated with the particular user device 210 (e.g., latitude and/or longitude, X and/or Y coordinates on a grid and/or geo fence, altitude and/or elevation, a street address, a location marker on a highway or train track, a particular cell, etc.). Network region field 740 may store information identifying a particular cell and/or network access point via which the particular user device 210 can communicate with network 270.

Velocity field 750 may store information associated with the relative motion of the particular user device 210, such as rate of speed (e.g., in miles per hour (mph), kilometers per hour (kph), etc.), a rate of change in speed (e.g., acceleration in feet per second per second (ft/s$^2$), meters per second per second (m/s$^2$), etc.), a direction or heading (e.g., a compass heading), a rate of change in heading (e.g., angular velocity—in degrees per second (deg/s), etc.), and/or rate of change of direction (e.g., angular acceleration—degrees per second per second (deg/s²)). It should be understood that derived location information (e.g., speed, acceleration, angular velocity, angular acceleration, etc.) may be received as location information from service gateway server 250 and/or may be a computed by event application 560 based on a change in grid location as a function of time. Activity field 760 may store information associated with the type of communication that the particular user device 210 is engaged (e.g., no activity, a call, a text message, an Internet session, etc.). Incident flag field 770 may store information that indicates whether a particular act has occurred that may trigger a potential event, such as a 911 call originating from the particular user device 210, a speed that is greater than a speed threshold, a rate of change in speed or direction (e.g., an acceleration) that is greater than an acceleration threshold (e.g., which may indicate that an impact and/or collision, associated with the particular user device 210, has occurred and/or some other act has occurred). In one implementation, event application 560 may store a value of "0" in incident flag field 770 to indicate that an incident, associated with the particular user device 210 has not been detected and a value of "1" in incident flag field 770 to indicate that an incident, associated with user device 210, has been detected. Time field 780 may store information associated with the particular point in time at which the user device state information, associated with the particular user device 210, is obtained (e.g., in hours (hh): minutes (mm): seconds (ss) or another format).

As an example and as shown by ellipse 790, a particular user device 210 may be a PDA of a particular type and/or version (e.g. PDA—4), may include a particular user device identifier (e.g., IMSI—103545687), and/or may be located at a particular grid location (4.234/A.623). Additionally, or alternatively, the particular user device 210 may be associated with a particular cell (e.g., cell 1), may be traveling at a particular velocity (e.g., 57 mph, north-northeast), and/or may be communicating with the network (e.g., text messaging) at a particular point in time (e.g., 15:35:05). In this example, incident flag field 770 may store a value of "0," indicating that an incident, associated the particular user device 210, has not been detected.

In another example, as shown by ellipse 792, incident flag field 770 may store a value of "1," indicating that an incident, associated with another user device 210 (e.g., a mobile telephone with an MDN—8435551111) has been detected. In this example, event application 560 may set incident flag 770 to indicate the occurrence of an incident, associated with the other user device 210, in response to detecting an act, such as a 911 call originating from the other user device 210, a potential accident due to an excessive velocity (e.g. a velocity that is greater than a particular threshold), an abrupt change in speed and/or direction (e.g., greater than a particular threshold), and/or other acts. Event application 560 may compare a quantity of incidents associated with values stored in one or more entries of field 750 to an incident quantity threshold and, based on the comparison, may determine whether there is a potential event with respect to user device 210.

Returning to FIG. 6, process 600 may include generating network state information and performing an operation to detect a potential event (block 630). For example, event application 560 may use the network content information and/or user device state information to generate network state information (e.g., network state information table 800 of FIG. 8) for each cell and/or region within a network (e.g., network 270), and/or a particular cell and/or a particular region of the network. As illustrated in FIG. 8, network information table 800 may store a network region field 810, a user device type field 820, an active user device quantity field 830, an activity level field 840, a relative flux field 850, an incident quantity field 860, a time field 870, and/or an event indicator field 880. While FIG. 8 illustrates a network state information table, that includes certain fields, such as fields 810-880, in another implementation, a network state information table may include fewer fields, additional fields, different fields or differently arranged fields than are described with respect to FIG. 8.

Network region field 810 may store information identifying a particular cell and/or network access point within a network (e.g., network 270) via which a quantity of active user devices 210 can communicate. User device type field 820 may store information associated with a particular type of user device 210 associated with the particular cell identified in field 810. For example, a particular row of user device type field 820 may store information identifying a particular type of user device 210 (e.g., a PDA), a particular model of the particular type of user device 210 (e.g., a PDA, such as a Palm Treo®), and/or a particular version of the particular model (e.g., Palm Treo® 600) associated with a particular active user device 210. Each row of user device type field 820 may store information associated with a particular type, model, and/or version of user device 210. Active user device quantity field 830 may store information associated with a quantity of the particular type, model, and/or version of user device 210 that are communicating via the particular cell. For example, event application 560 may determine that there is a quantity of cellular phones powered up and able to communicate via a particular cell at a particular point in time. In another example, event application 560 may determine that there is a different quantity of PDAs powered up and able to communicate, via the particular cell, at the particular point in time. Each row of user device quantity field 830 may store information associated with a quantity of a particular type, model, and/or version of user device 210 that is able to communicate via the particular cell at the particular point in time.

Activity level field 840 may store information associated with the amount of communication that is occurring within the particular cell as a function of the quantity of the particular types of user devices within the particular cell. For example, event application 560 may determine that a high level of activity is occurring within the particular cell, when a quantity of the particular type of user device 210, that are communicating within network 270, exceeds a particular threshold (e.g., one of every two devices (50%)). In another example, event application 560 may determine that a normal level of activity is occurring within the particular cell when the quantity of the particular type of user device 210, that is communicating with network 270, is less than or equal to the particular threshold and is greater than another threshold (e.g., one of every four devices (25%)). In yet another example, event application 560 may determine that a low level of activity is occurring within the particular cell, when the quantity of the particular type of user device 210, that is communicating with network 270, is less than or equal to the other threshold.

Relative flux field 850 may store information indicating whether a quantity of a particular type of user device 210, located within the particular cell (e.g., the cell identified in field 810), is increasing, is decreasing, or is unchanged relative to a prior point in time. Incident quantity field 860 may store information corresponding to a quantity of incidents, associated with a particular type of user device 210 and/or the particular cell, as described above with respect to FIG. 7. For example, the event application may detect a quantity incidents, associated with a 911 call, excessive speed (e.g., above a particular speed threshold), sudden acceleration (e.g., changes in speed and/or direction that is greater than a particular threshold), and/or other incidents, that correspond to a particular type of user device 210 or a set of the particular type of user devices 210 within the particular cell and may store a value associated with the quantity of incidents detected. In another example, Time field 870 may store information associated with the particular point in time at which the network state information is obtained (e.g., in hours (hh): minutes (mm): seconds (ss) and/or another format). Event indicator 880 may store information associated with whether an event has been detected. In one implementation, event application 560 may set event indicator field 880 (e.g., may store a value of "1" in event indicator field 880) if event application 560 determines that an event is detected (e.g., if the quantity of incidents is greater than a particular threshold and/or the occurrence of some other act or incident). If event application 560 determines that an event is not detected (e.g., the quantity of incidents is equal to, or below, the particular threshold), then event application 560 may not set the event indicator (e.g., may store a value of "0" in event indicator field 880).

As an example, as shown by ellipse 890, event application 560 may determine that a particular cell (e.g., cell 1) may contain a particular type of user device 210 (e.g., a mobile telephone of a particular model and/or version) and that a quantity of the particular type of user device 210 (e.g., 3,456) are communicating, via the particular cell, at a particular point in time (e.g., 15:35:00). Event application 560 may compare the quantity of the particular type of user device 210 with an activity threshold(s), and based on the comparison, may determine that a normal quantity (e.g., greater than 25% and/or less than or equal to 50%, and/or some other value(s)) of the particular type of user device 210 are communicating, via the particular cell, at a particular point in time (e.g., 15:35:05). In this example, event application 560 may determine that the quantity of mobile phones, associated with cell 1, may have increase by 10% relative to a quantity of mobile telephones associated with cell 1 at a prior point in time and/or at a previous point in time when the previous network state information was generated. Additionally, or alternatively, event application 560 may not have detected any incidents and/or events, associated the particular type of user devices 210, and may store a value of "0" in incident quantity field 860 and/or event indicator field 880, respectively.

Event application 560 may store total network state information. As an example, as shown by ellipse 898, event application 560 may store network state information for each type of user device 210 (e.g., as shown by ellipses 890 through 896) that are associated with a particular cell (e.g., cell 1) at the particular point in time (e.g., 15:35:05). Event application 560 may determine that a total quantity of user devices 210 (e.g., 14,139) may be associated with the particular cell (e.g., powered up and/or able to communicated via cell 1), of which a particular quantity of user devices 210 (e.g., a normal quantity) may be engaged in some form of activity via the particular cell (e.g., text messaging, calling, browsing the internet, etc.). Additionally, or alternatively, event application 560 may determine that the quantity of active user devices 210, associated with cell 1, may have increase by 6% relative to a quantity of active user devices 210, associated with cell 1, at a prior point in time and/or at a previous point in time when the previous network state information was generated.

Incident quantity field 860 may store a value of "1" indicating that a single incident, associated with a particular type of use device 210 (e.g., a PDA as shown by ellipse 892), was detected by event application 560. Event application 560 may compare the quantity of incidents with an incident threshold and may store a value of "0" in field 880 when the total quantity of incidents are less than, or equal to the incident threshold. It should be understood that the network state information table may include network state information associated with other network regions (e.g., cells 2, 3, . . . , L) and/or that total network state information may be generated for other cells, a group of cells, and/or all cells associated with the network (e.g., network 270).

In another example, event application 560 may generate and/or store network state information based on a particular location. For example, event application 560 may generate network state information, associated with a location and/or an area that is determined to be particularly sensitive (e.g., an airport, an urban center, a government building, a nuclear power plant, etc.), at a frequency that is greater than another frequency at which network state information is generated with respect to an area that is not determined to be sensitive (e.g., a rural area, a wilderness area, etc.). In another example, event application 560 may store (e.g., cache) network state information, associated with a location and/or an area that is determined (e.g., by local, state, and/or federal authorities and/or a network administrator associated with network 200) to be particularly sensitive, for a particular period of time that is greater than another period of time for which network state information is stored with respect to an area that is not determined to be sensitive.

Returning to FIG. 6, if a potential event is detected (640—YES), then a notification reporting the potential event may be sent and state information may be sent (block 650). Event application 560 may determine whether an event has been triggered in a number of ways using the user device state information and/or the network device state information.

An operation may be performed to determine whether a potential event is detected based on the state information. For example, event application 560 may use the state information (e.g., network state information table 800 of FIG. 8), to determine that a potential event exists. Event application 560 may, for example, compare a quantity of incidents (e.g., obtained from incident quantity field 860 of FIG. 8), corresponding to a cell, a set of cells, and/or network 270, with a particular incident threshold and, based on the comparison, may determine that a potential event exists when the quantity of incidents is greater than the particular incident threshold. Event application 560 may set the event indicator, by storing a value of "1" in event indicator field 880, based on the determination that a potential event exists.

In another example, event application 560 may determine that a potential event has occurred if two or more identified incidents are co-located (e.g., are separated by a distance that is less than, or equal to, some threshold) based on the location information obtained from the user device state information (e.g., grid location field 730 of FIG. 7). In yet another example, event application 560 may determine that a potential event exists if the quantity of incidents are detected within a period of time that is less than, or equal to, a time threshold based on time field 780 (FIG. 7).

In another example, event application 560 may determine that a potential event exists when the activity level (e.g., obtained from activity level field 840 of FIG. 8), corresponding to a cell, a set of cells, and/or network 270, is greater than a high activity threshold. In this example, event application 560 may determine that a potential event exists, based on a high activity level, which may indicate that some event has occurred (e.g., a major accident witnessed and/or experienced by a number of users of user devices 210). In yet another example, event application 560 may determine that a potential event exists when the activity level (e.g., obtained from activity level field 840 of FIG. 8), corresponding to a cell, a set of cells, and/or network 270, is less than, or equal to, a low activity threshold. In this example, the low activity level may indicate the occurrence of some event that has disabled, and/or rendered inoperable, a number of user devices 210 and/or cells via which the number of user devices 210 communicate.

In still another example, event application 560 may determine that a potential event exists when the relative flux (e.g., obtained from relative flux field 850 of FIG. 8), corresponding to a quantity of user devices 210 that are entering or leaving a cell, a set of cells, and/or network 270, is greater than a particular flux threshold. In this example, a high relative flux (e.g., above the flux threshold) may indicate that users of user devices 210 are leaving and/or evacuating an area at which a potential event is determined to exist (e.g., due to a flash flood, an explosion, a train accident, a hazardous material discharge, etc.).

A notification indicating that a potential event has occurred may be sent. For example, event application 560 may determine that a potential event exists and may generate a notification to report the potential event. In one example, event application 560 may send the notification to a server device associated with local, state, and/or federal authorities, first responders (e.g., law enforcement, fire department, medical personnel, etc.) and/or another server device. The notification may include some or all of the state information (e.g., user device state information and/or network state information) and/or some or all of the network content information received from network 270.

In another example, event application 560 may generate a notification indicating that a potential event has been detected and may send the notification to user devices 210. For example, information (e.g., messages, instructions, notifications etc.) may be outputted (e.g., pushed) to user devices 210 based on state information and/or network content information associated with the potential event. In this example, event application 560 may push particular information received from web servers 230, such as alternative routes, evacuation routes, notifications (e.g., election results, breaking news, etc.), maps, images, live scene video, streaming media, etc., to each user device 210 based on the type of user device 210 to which the information is being pushed. In another example, the event application may detect an increase in activity of a quantity of user devices 210 located at a local stadium and may use information obtained from web server 230 (e.g., a score update, a schedule associated with a local sports team, an advertisement, etc.) to generate a notification. The event application may send the notification to other user devices 210 indicating that a score has occurred, advertising merchandise associated with the local sports franchise, updating traffic patterns in the location of the stadium, etc.

Additionally, or alternatively, event application 560 use the presence information (e.g., user device identification information and/or information associated with the types, models, and/or versions of user devices 210) and/or capabilities information associated with user devices 210, to push information that has been configured to be received and/or handled by each type, model, and/or version of user device 210. Event application 560 may, at a later point in time, receive other normalized network content and may, in a manner similar to that described above (with respect to block 610), process the other normalized network content to determine whether a potential event has occurred.

If a potential event is not detected (640—NO), then network presence information may be sent (block 660). For example, event application 560 may determine that a potential event was not detected based on the state information. In this example, event application 560 may compare the quantity of incidents (e.g., obtained from field 860 of FIG. 8) with a particular incidents threshold and may, based on the comparison, determine that the quantity of identified incidents does not exceed a particular threshold. In another example, event application 560 may not detect any co-located incidents (e.g., two or more incidents that are not separated by a distance that is less than some threshold). In yet another example, event application 560 may determine that a particular quantity of incidents are not detected within a period of time that is less than or equal to a time threshold.

In still another example, event application 560 may determine that a potential event has not occurred when the activity level is not greater than a high activity threshold and/or is not less than or equal to a low activity threshold. In yet another example, event application 560 may determine that a potential event has not occurred when the relative flux is not greater than a particular flux threshold.

Event application 560 may determine that a potential event has not been detected and may send some or all of the state information (e.g., user device state information and/or network state information) to a server device associated with authorities (e.g., local, state, and/or federal authorities), first responders (e.g., police, medical personnel, firemen, etc.) and/or another server device. Event application 560 may, at a later point in time, receive other normalized network content and may, in a manner similar to that described above (with respect to block 610), process the other normalized network content to determine whether a potential event has occurred.

Figure 9:
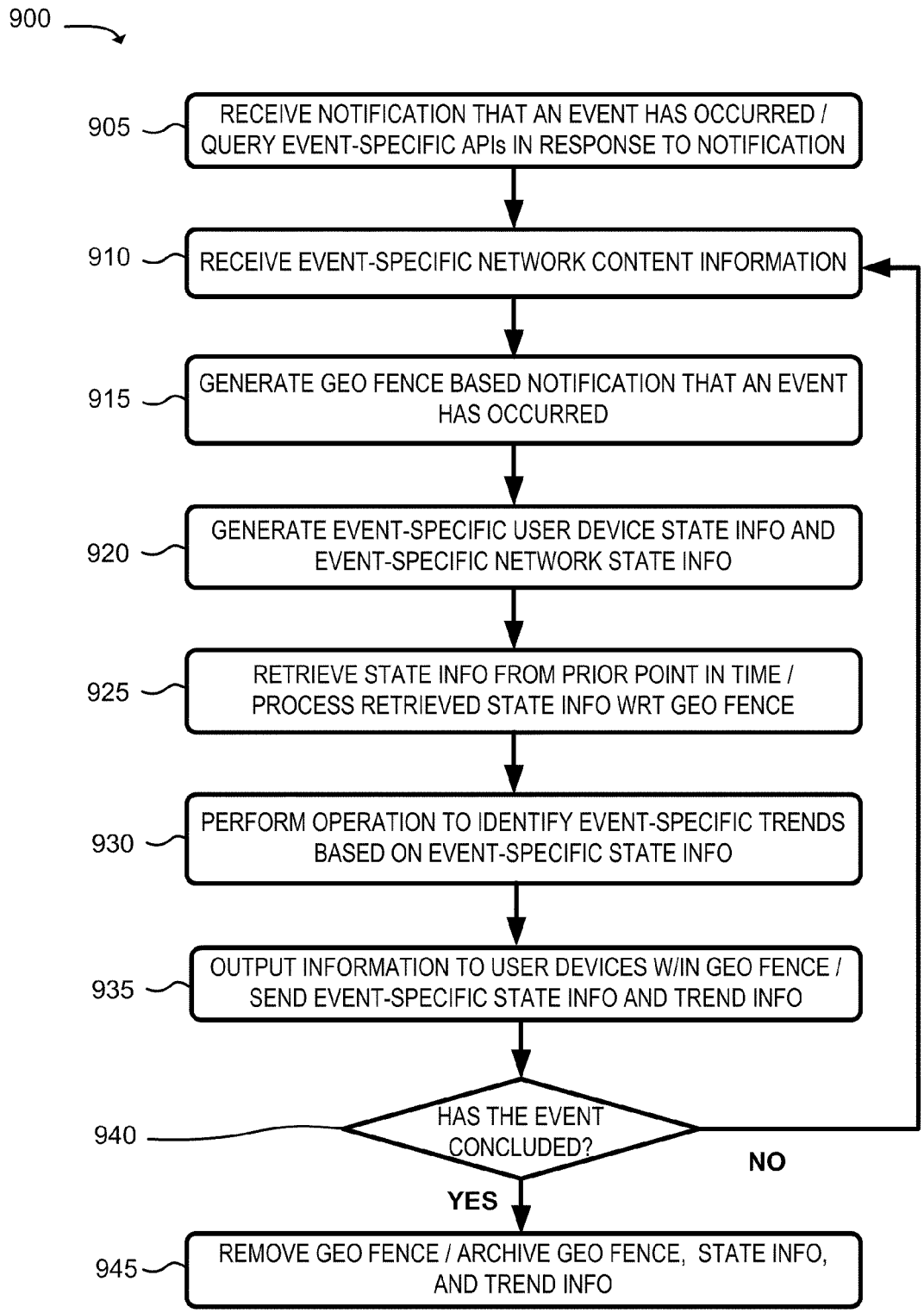
FIG. 9 is a flowchart of an example process for generating event-specific state information within an example portion of the network of FIG. 2.

FIG. 9 is a flowchart of an example process 900 for generating event-specific state information within an example portion of network 200 (FIG. 2). In one implementation, process 900 may be performed by application server 260. In another implementation, some or all of process 900 may be performed by a device or collection of devices separate from, or in combination with, application server 260. FIG. 10 is a diagram of an example event-specific network state information table 1000 capable of being in network 200 (FIG. 2). A portion of process 900, of FIG. 9, will be discussed below with corresponding references to event-specific network state information table 1000 shown in FIG. 10.

Process 900, of FIG. 9, may include receiving a notification that an event has occurred and querying event-specific API's in response to the notification (block 905). For example, service gateway server 250 may receive a notification and/or an alert that an event has been reported and/or has occurred from a network device (e.g., public server 240, web server 230, and/or some other network device). Service gateway server 250 may process the notification using a particular API (e.g., 911 API 435 and/or alerts API 940 of FIG. 4) and may send the notification to application server 260. The notification information may include information associated with the type of event (e.g., a car accident, a train accident, a weather incident, a hazardous waste discharge, a terrorist attack, etc.), the approximate location of the event (e.g., latitude, longitude, a street address, a grid location on a map, etc.), the approximate point in time that the event occurred or was reported, information associated with an affected geographical area (e.g., a storm warning for a particular geographical area, a police perimeter, a road closing, evacuation routes, boundaries, coordinates, etc.), and/or other information associated with the event. Application server 260 may receive the notification and event application 560 may use the notification to generate a query to retrieve event-specific network content information in response to the notification. Event application 560 may send the query to service gateway server 250 requesting the event-specific network content information, other alert information from local, state, regional and/or federal authorities (e.g., via alerts API 440), 911 dispatch information (e.g., via 911 API 435), and/or other information potentially associated with the event. In another implementation, event application 560 may send the query to another network device (e.g., web server 230, public server 240, etc.) instead of, or in addition to, service gateway server 250 and may receive information, in response to the query, directly from the other network devices instead of or in addition to service gateway server 250.

In another implementation, event application 560 may generate the query to receive the event-specific network content information and may send the query to service gateway server 250, or some other network device, as a result of an operation to detect a potential event, in a manner similar to that described above with respect to blocks 610-650 of FIG. 6.

Process 900 may also include receiving event-specific network content information (block 910). For example, application server 260 may, in a manner similar to that described above (e.g., with respect to block 620 of FIG. 6), receive normalized event-specific network content and may process the normalized event-specific network content to create event-specific network content information.

Process 900 may further include generating a geo fence based on a notification that an event has occurred (block 915). For example, event application 560 may use the event-specific network content information to generate a geo fence in response to the notification that an event has occurred and/or based on the received event-specific network content information. For example, event application 560 may use the location information and/or information associated with the affected geographical area, obtained from the notification, to establish parameters with which to generate a logical geo fence using the geo information obtained from the event-specific network content information. In this example, if the notification includes a geographical area that is sufficiently defined (e.g., such as an affected county or set of counties, boundaries defined by latitude and longitude, a particular coordinate for a center point and a radius, etc.), event application 560 may generate the geo fence based on the defined geographical area. In another example, event application 560 may establish the parameters of a geo fence based on the quantity of events that are identified by the received notification and/or a set of received notifications. In this example, a single event may include a geo fence with parameters that are different than a geo fence associated with multiple events. In the latter case, individual geo fences, each associated with a single event, may be combined to form a larger geo fence and/or a geo fence with difference parameters.

In another implementation, event application 560 may establish parameters of a geo fence based on the type and/or extent of an event. For example, event application 560 may establish the parameters of a geo fence based on estimates of a quantity of people (e.g., a quantity of users of user devices 210) directly involved in the event. In this example, parameters for a geo fence for a one car accident (e.g., a perimeter of 50 ft., 100 ft., 200 ft., etc.) may be different than a geo fence for a multi-car accident (e.g., 200 ft., 300 ft., 500 ft. etc.). In another example, event application 560 may establish the parameters of a geo fence based on estimates of a quantity of people affected by the event. In this example, a geo fence for a car accident on an urban street and/or highway (e.g., 200 ft., 300 ft., 500 ft. etc.) may be different than a geo fence for a car accident on a rural road (e.g., 50 ft., 100 ft., 200 ft. etc.). In yet another example, a geo fence for an accident involving a truck that is hauling furniture (100 ft., 200 ft. 500 ft., etc.) may be different than a geo fence for an accident involving a truck hauling hazardous materials (e.g., 500 ft., 1000, ft., 2000 ft., etc.). In yet another example, event application 560 may establish parameters for a geo fence associated with a security event, such as an event that involves the potential use of weapons of mass destruction (e.g., conventional bombs using nuclear material, chemical and/or biological weapons, etc.) that may be different than a security event that involves weapons other than weapons of mass destruction.

Additionally, or alternatively, event application 560 may establish parameters for a geo fence based on environmental factors. For example, event application 560 may establish the parameters of a geo fence based on the location of the event relative to the environment in which the event occurs, such as urban versus rural, land versus water, good weather versus bad weather, etc. Additionally, or alternatively, event application 560 may use user device state information and/or network state information, described above with respect to blocks 620-640 of FIG. 6, to determine parameters for a geo fence. For example, event application 560 may obtain, from user device state information, location information associated with user devices 210 from which 911 calls were placed that correspond to and/or are in a particular proximity of the event location. Event application 560 may, for example, use the location information to determine parameters of the geo fence. In another example, event application 560 may obtain, from network state information, information corresponding to cells with high incident quantities (e.g., a quantity of incidents that event application 560 determines are greater than a particular incident threshold), and may determine some or all of the parameters of the geo fence based on the cells determined to have high incident quantities.

Process 900 may also include generating event-specific user device state information and event-specific network state information (block 920). For example, event application 560 may obtain location information, associated with user devices 210, from the received event-specific network content information and may use the parameters of the geo fence (e.g., boundary information, coordinates, perimeter specifications, etc.) to determine which user devices 210 are located within the boundaries of the geo fence. In a manner similar to that described above, with respect to block 620 (FIG. 6), event application 560 may generate event-specific user device state information based on event-specific network content information for user devices 210 determined to be located within the geo fence boundaries. Additionally, or alternatively, event application 560 may use the event-specific user device information to identify any incidents (e.g., 911 calls, abrupt changes in speed and/or direction, excessive velocity, etc.) associated with user devices 210 determined to be located within the geo fence.

In another example, event application 560 may use the received event-specific network content information and/or the event-specific user device state information to generate event-specific network state information (e.g., event-specific network state information table 1000 of FIG. 10) associated with the geo fence. As illustrated in FIG. 10, event-specific network state information table 1000 may include a geo fence field 1010, a user device type field 1020, an active user device quantity field 1030, an activity level field 1040, a quantity in critical zone field 1050, a relative flux field 1060, an incident quantity field 1070, and/or an event time field 1080 (e.g., measured in hours (hh): minutes (mm): seconds (ss) or another format). While FIG. 10 illustrates event-specific network state information table 1000, including certain fields, such as fields 1010-1080, in another implementation, event-specific network state information table 1000 may include fewer fields, additional fields, different fields, or differently arranged fields than are described with respect to FIG. 10.

Geo fence field 1010 may store geographic parameters associated with a geo fence generated by event application 560, such as a set of coordinates (e.g., latitudes and longitudes, and/or other coordinates) that define the boundaries of the geo fence within which a quantity of active user devices 210 are located. User device type field 1020 may store information associated with a particular type, model, and/or version of user device 210, as described above with respect to FIG. 8, associated with the geo fence. Active user device quantity field 1030 may store information associated with a quantity of the particular type, model, and/or version of user device 210, as described above with respect to FIG. 8., that are located within the boundaries of the geo fence. Activity level 1040 may store information associated a relative quantity of activity (e.g., a quantity of communication, such as texting, emailing, calling, Internet browsing, etc.), by user devices 210, that is occurring within the geo fence as a function of the quantity of the particular types, models, and/or versions of user devices 210 within the geo fence. For example, in a manner similar to that described above with respect to field 840 (FIG. 8), event application 560 may determine whether a high level, a normal level, or a low level of activity is occurring within the geo fence.

Quantity in critical zone field 1050 (hereinafter referred to as critical zone field 1050) may store information associated with user devices 210 of a particular type, model, and/or version that are identified as being located within the boundaries of the geo fence and are further identified as being located within a critical zone corresponding to a particular location at which the event occurred (e.g., ground zero). The critical zone may be defined (e.g., by parameters, such as boundaries, a set of coordinates, a perimeter, and/or other parameters) as a distance from an area around ground zero and/or within which a user (e.g., a user of a user device 210) is likely to have been directly affected by the event (e.g., a user of a user device 210 involved in a multi-car accident, displaced from a home due to a flood, etc.). Relative flux field 1060 may store information that indicates whether the quantity of a particular type of user device 210 is increasing, is decreasing, or is unchanged over some period of time. Incident quantity field 1070 may store information corresponding to a quantity of identified incidents for each type of user device 210, associated with the quantity of user devices 210 within the geo fence, based on the event-specific user device state information described above. Event time field 1080 may store a particular point in time, obtained from the received notification, at which the event occurred, was detected, and/or was reported (hereinafter referred to as the event time).

As an example and as shown by ellipse 1090, event application 560 may determine that a geo fence (e.g. ABCD as described in FIG. 1) may contain a particular type of user device 210 (e.g., mobile telephones of a particular model and/or version) and a particular quantity of the particular type of user device (e.g., 5,789). Event application 560 may, in a manner similar to that described above (e.g., with respect to block 630 of FIG. 6), determine that a high quantity of the particular type of user device 210 are communicating (e.g., greater than a high activity threshold, such as 50%) with network 270, at a particular event time (e.g., 15:35:05). In this example, event application 560 may determine that a particular quantity (e.g., 18), of the particular type of user device 210, are located within a critical zone established by event application 560 and/or a network administrator. Additionally, or alternatively, event application 560 may store a value of "0%" in relative flux field 1060 for the first instance in which event application 560 generates event-specific network state information. At a future point in time, however, event application 560 may compare the quantity of user devices 210, of a particular type, model, and/or version, with a quantity of user devices 210 of the particular type, model, and/or version at a prior point in time to determine the relative flux associated with a particular type, model, and/or version of user devices 210 that are entering and/or leaving the geo fence since the event time and/or since the prior point in time. Event application 560 may identify, from the event-specific user device state information, a quantity of incidents (e.g., 76) associated with a particular type of user device 210.

Event application 560 may store total event-specific network state information. For example, as shown by ellipse 1098, event application 560 may store event-specific network state information for each type, model, and/or version of user device 210 (e.g., as shown by ellipses 1090 through 1096) that is associated with the geo fence (e.g., ABCD) at the event time (e.g., 15:35:05). Event application 560 may determine that a total quantity of user devices 210 (e.g., 20,170) may be located within the geo fence, of which a particular quantity of user devices 210 (e.g., a high quantity based on a determination that the particular quantity is greater than a high activity level threshold) may be engaged in some form of communication with the network (e.g., text messaging, making calls, making 911 calls, etc.). In this example, event application 560 may determine that a particular quantity (e.g., 48) of user devices 210 are located within a critical zone and/or that a quantity of incidents (e.g., 242) has been identified based on the event-specific user device state information.

Process 900 may further include retrieving state information from a prior point in time and processing retrieved state information with respect to the geo fence (block 925). For example, state information generated by event application 560 at a prior point in time (e.g., a point in time prior to the event time) and/or network content information, received by event application 560 at the prior point in time, may be retrieved from a memory (e.g., a memory associated with application server 260 or some other memory). Event application 560 may use the retrieved network content information and/or the retrieved state information to generate event-specific state information (e.g., event-specific user device state information and/or event-specific network state information), associated with the geo fence, at the prior point in time.

Event application 560 may identify particular incidents that occurred at a point in time that is prior to the event time. For example, an incident may be identified that involves a particular user device 210 traveling, within the geo fence and/or within the critical zone, at an excessive speed (e.g., a speed that is greater than a particular threshold) away from ground zero prior to the event time. In this example, event application 560 may retrieve call history information from service gateway server 250, via a particular API (e.g., history API 430 of FIG. 4), associated with the particular user device 210.

In another example, event application 560 may retrieve network content information, associated with the particular user device 210, from service gateway server 250, via a particular API (e.g., content API 425 of FIG. 4). Event application 560 may perform, for example, an operation on the network content (e.g., call content, text message content, browser content, email content, etc.) using content signatures to identify whether key words are contained in the network content that may cause event application 560 to identify an incident. Event application 560 may, for example, perform another operation on the network content (e.g., image content, video content, voice content, etc.) using content signatures to identify a key face (e.g., of a missing person, of a person of interest, etc. using facial recognition technology and/or other technologies), a key voice (e.g., of a victim of a crime, etc., using speech recognition technology and/or other technologies), etc. In yet another example, the locations of particular user devices 210, associated with particular users who may be affected by the event, may be located prior to the event time. In still another example, the activity level, relative flux, and/or other information, prior to the event time, may be of interest to authorities to identify circumstances and/or conditions leading up to the event.

Process 900 may also include performing an operation to identify event-specific trends based on event-specific state information (block 930). For example, event application 560 may use event-specific state information, associated with the geo fence, generated with respect to a particular point in time (e.g., a prior point in time) and event-specific state information, associated with the geo fence, generated with respect to another point in time (e.g., the event time, a point in time that is after the event time, and/or some other point in time) to identify trends for a period of time prior to the event time and/or for another period of time that occurs during and/or after the event time. In this example, event application 560 may identify whether users of user devices 210, determined to be inside of the geo fence, are evacuating by determining the relative flux for a particular period of time. In another example, the quantity of user devices 210 in the critical zone prior to the event time and/or immediately after the event time may be determined. In yet another example, event application 560 may determine changes in the activity level, associated with user devices 210 determined to be inside the geo fence, over a particular period of time based on activity levels at a particular point in time (e.g., prior to the event time) and activity levels at a later point in time (e.g., after the event time may).

Process 900 may further include outputting information to user devices 210 within the geo fence and sending event-specific state information and trend information (block 935). For example, event application 560 may output (e.g., push) information (e.g., messages, instructions, notifications etc.) to user devices 210 based on notifications and/or instructions received from authorities (e.g. local, state, federal, and/or other authorities) and/or other sources (e.g., from event-specific state information, third parties, etc.). In one example, event application 560 may push particular information (e.g., alternative routes, evacuation routes, maps, images, etc.) to each user device 210 based on the type of user device 210 to which the information is being pushed. In this example, event application 560 may retrieve, from a network device (e.g., from service gateway server 250 or some other network device), user device 210 capabilities information and/or presence information associated with user devices 210 that were determined to be within the boundaries of the geo fence. Event application 560 may use the presence information, to push information that has been configured to be received and handled by each type of user device 210.

Event-specific state information and/or trend information may be sent. For example, event application 560 may send event-specific user device state information to a server device associated with authorities, first responders, and/or other devices of network 270. Additionally, or alternatively, event application 560 may send event-specific network state information to a server device associated with authorities, first responders, and/or other devices of network 270. In another example, event application 560 may send trend information to a server device associated with authorities, first responders, and/or other devices of network 270. In this example, event application 560 may send trend information associated with circumstances that existed and/or incidents that occurred prior to, during, and/or after the event time.

If the event has not concluded (block 940-NO), then other normalized content may be received (block 910). For example, event application 560 may not have received a notification indicating that the event has concluded, may continue to receive other network content information, and/or may continue to generate event-specific state information with respect to the geo fence associated with the event.

If the event has concluded (block 940—YES), then the geo fence may be removed, information associated with the geo fence, event-specific state information and/or trend information may be archived, and process 900 may end (block 945). For example, event application 560 may receive a notification indicating that the event has been remedied and/or has been otherwise concluded. Event application 560 may, based on the notification, remove the geo fence and/or may store, in a memory (e.g., a memory associated with the application server 260 and/or another memory), information associated with the geo fence, event-specific state information and/or trend information. Additionally, or alternatively, event application 560 may store network content information in a memory and may send a notification to user devices 210 that the event has concluded.

Implementations described herein may provide for event detection and response using network content. An event application may obtain network content from a network and may use the network content to detect a potential event, such as an automobile accident, 911 calls, etc. The event application may send the network content and/or information associated with detecting the potential event to authorities and/or first responders (e.g., potential event location, user device locations, etc.). The event application may send a notification to user devices associated with the potential events (e.g., instruction to avoid a particular area, an update on a local football score, notifications regarding traffic conditions, etc.). Additionally, or alternatively, the event application may generate a geographic fence to identify user devices that are located in the vicinity of, and/or are potentially affected by an event. The event application may, for example, use the geo fence to obtain network content to identify network conditions and/or circumstances before, during, and/or after the event. The event application may send the network content to authorities and/or first responders who may use the information in their response.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 9, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions.

A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first server, a notification indicating that an event has occurred,
      the notification including information regarding a geographic area associated with the event;
   sending, by the first server and to a second server, a request, for network content, based on the notification;
   receiving, by the first server and from the second server, the network content for a plurality of user devices,
      the network content including location information for the plurality of user devices and incident information, and
      the incident information indicating that an incident is associated with one or more user devices of the plurality of user devices;
   generating, by the first server, geo fence information based on the information regarding the geographic area associated with the event,
      the geo fence information including coordinates that define boundaries for a geo fence that surrounds the geographic area associated with the event;
   generating, by the first server and based on the geo fence information, state information, for the one or more user devices
      the state information including a portion of the location information associated with the one or more user devices;
   sending, to a third server, the state information;
   receiving, by the first server and from the second server, other network content for the plurality of user devices,
      the other network content including information associated with two or more emergency calls and other location information for the plurality of user devices;
   determining, based on the other network content, that at least two user devices, of the plurality of user devices, placed the two or more emergency calls;
   determining, by the first server and based on the location information, that a potential event exists when one of the at least two user devices was located at a distance that was less than or equal to a particular threshold relative to another one of the at least two user devices; and
   sending, by the first server and to the third server, information associated with the potential event after determining that the potential event exists.

2. The method of claim 1, further comprising:
   receiving, from the second server, additional network content for a particular user device of the plurality of user devices,
      the additional network content including additional location information for the particular user device and a velocity associated with the particular user device;
   determining that a different incident, associated with the particular user device, has occurred when the velocity is greater than a particular threshold; and
   sending information associated with the different incident or the other location information to the third server.

3. The method of claim 1, further comprising:
   receiving, from the second server, additional network content for the plurality of user devices,
      the additional network content including additional location information for the plurality of user devices and other incident information for the plurality of user devices;
   determining a quantity of incidents, associated with the plurality of user devices, based on the other incident information;
   identifying a potential event when the quantity of incidents is greater than an incident threshold; and
   sending, to the third server, another notification indicating that the potential event has been identified.

4. The method of claim 1, where generating the state information for the one or more user devices includes:
   determining that the one or more user devices are located within the geo fence based on the boundaries for the geo fence and the location information for the one or more user devices.

5. The method of claim 4, where generating the state information for the one or more user devices includes:
   determining a first quantity of the one or more user devices;
   retrieving other state information, associated with the geo fence, from a prior point in time;
   determining a second quantity of user devices, of the plurality of user devices, that are located within the boundaries for the geo fence, at the prior point in time, based on the other state information;
   determining a relative flux of user devices, associated with the geo fence, based on the first quantity and the second quantity; and
   generating the state information based on the relative flux of user devices.

6. The method of claim 1,
   where the geographic area associated with the event includes coordinates associated with the location of the event; and
   where generating the state information for the one or more user devices includes:
      generating a critical zone that surrounds the coordinates associated with the location of the event,
         the critical zone being a particular area that is located inside the boundaries for the geo fence;
      determining that at least one user device, of the one or more user devices, is located within the critical zone based on the particular area and the location information for the at least one user device; and
      generating the state information based on information that indicates that the at least one user device is located within the critical zone.

7. The method of claim 6, further comprising:
retrieving map information associated with the geographic area associated with the event; and
sending, to the at least one user device, an instruction to evacuate the geographic area associated with the event, the instruction including the map information or evacuation routes associated with the map information.

8. The method of claim 1, where the event includes one or more of an accident, a natural disaster, a manmade disaster, or a security event.

9. A server device comprising:
a processor to:
receive a notification indicating that an event has occurred,
the notification including information regarding a location of the event,
send, to a second server device and based on the notification, a request for network content,
receive, from the second server device, the network content for a plurality of user devices,
the network content including location information for the plurality of user devices and indicating that at least one incident was detected,
determine, based on the network content or the location information, that one or more user devices, of the plurality of user devices, are associated with the at least one incident or are located within a particular distance of the location of the event,
generate, based on the location information, information associated with a geo fence,
the information associated with the geo fence including a set of boundaries that surround the location of the event, and
the one or more user devices being located within the set of boundaries,
generate, based on the information associated with the geo fence, state information, for the one or more user devices, using the network content,
the state information including a quantity of the one or more user devices and a quantity of the at least one incident, and
send, to a third server device, the quantity of the at least one incident, the quantity of the one or more user devices, or the location information for the one or more user devices,
receive, from the second server device, other network content for the plurality of user devices,
the other network content including information associated with two or more emergency calls and other location information for the plurality of user devices,
determine, based on the other network content, that at least two user devices, of the plurality of user devices, placed the two or more emergency calls,
determine, based on a portion of the location information associated with the at least two user devices, that a potential event exists when one of the at least two user devices was located at a distance that was less than or equal to a particular threshold relative to another one of the at least two user devices, and
send, to the third server, information associated with the potential event.

10. The server device of claim 9, where the processor is further to:
receive, from the second server device and at a first point in time, first network content that includes a first location of a particular user device of the plurality of user devices,
receive, from the second server device and at a second point in time, second network content that includes a second location of the particular user device,
determine a change in location based on the first location and the second location,
determine that an incident, associated with particular user device, has occurred when the change in location, exceeds a threshold relative to a particular period of time from the first point in time to the second point in time, and
send information associated with the incident.

11. The server device of claim 9, where the processor is further to:
receive, from the second server device, additional network content for the plurality of user devices,
the additional network content including information associated with one or more incidents,
identify a quantity of the one or more incidents,
determine that another potential event exists when the quantity of the one or more incidents is greater than an incident threshold; and
send information regarding the other potential event.

12. The service device of claim 11,
where the additional network content includes additional location information for the plurality of user devices, and
where the processor is further to:
identify, based on the additional network content, at least one user device, of the plurality of user devices, that is associated with the one or more incidents,
determine a location, associated with the at least one user device, based on the additional location information, and
send another notification to the plurality of user devices indicating that the location, associated with the at least one user device, is to be avoided.

13. The server device of claim 9, where the processor is further to:
retrieve, from the second server device, map information associated with the geo fence, and
send an instruction, to the one or more user devices, to evacuate an area associated with the geo fence, the instruction including evacuation routes based on the map information.

14. The server device of claim 9, where, when generating the state information for the one or more user devices, the processor is to:
identify one of the one or more user devices that is located within a critical zone area that surrounds the location of the event and that is located within the set of boundaries associated with the geo fence,
determine that the one of the one or more user devices is associated with one of the at least one incidents, and
generate the state information based on information that indicates that the one of the one or more user devices is associated with the one of the at least one incidents.

15. The server device of claim 14, where the processor is further to:
retrieve, from the second server device, call history information or call content information associated with the one of the one or more user devices, and send, to the third server device, information associated with the one of the at least one incidents, the call history information, or the call content information.

16. The server device of claim 9, where, when generating the state information for the one or more user devices, the processor is to:
    determine an activity level, associated with the one or more user devices, based on the network content
        the activity level being a measure of a quantity of communication occurring by the one or more user devices, and
    generate the state information based on the activity level.

17. A system comprising:
    a first server device to:
        receive network content from a second server device,
            the network content including location information for a plurality of user devices and information associated with two or more emergency calls,
        determine, based on the network content, that at least two user devices, of the plurality of user devices, placed the two or more emergency calls,
        determine that a potential event exists when, at a time of placing the two or more emergency calls, one of the at least two user devices was located at a distance that was less than or equal to a particular threshold relative to another one of the at least two user devices,
        generate a geo fence based on the network content,
            the geo fence including a set of boundaries associated with a location of the potential event,
        generate, based on the geo fence, state information associated with at least one user device of the plurality of user devices, located within the geo fence, and
        send the state information or the network content to a third server device.

18. The system of claim 17, where the first server device is further to:
    determine a first quantity of user devices, of the plurality of user devices, that were located within the geo fence at a prior point in time,
    determine a second quantity of user devices, of the plurality of user devices, that are located within the geo fence based on the state information,
    determine a relative flux, associated with the geo fence, based on the first quantity of user devices and the second quantity of user devices, and
    send information associated with the relative flux.

19. The system of claim 18, where, when determining the relative flux associated with the geo fence, the first server device is to:
    determine that a total quantity of user devices within the geo fence is decreasing when the second quantity of user devices is less than the first quantity of user devices.

20. The system of claim 17,
    where the network content further includes incident information associated with the plurality of user devices; and
    where the first server device is further to:
        determine a quantity of incidents based on the incident information,
        determine that a different potential event exists when the quantity of incidents exceeds an incident threshold, and
        send information regarding the different potential event.

21. The system of claim 17,
    where the first server device is further to:
        receive a notification that an event has occurred,
            the notification including information associated with a location of the event,
        determine information associated with a particular user device of the plurality of user devices,
            the information associated with the particular user device indicating that, at a point in time before the event occurred, the particular user device was traveling at a speed that exceeded a particular threshold and at a location that was less than or equal to a particular distance from the location of the event, and
        send the information associated with the particular user device to the third server.

22. The system of claim 21, where the first server device is further to:
    retrieve, from the second server device, call content information associated with the one of the one or more user devices,
    identify one or more key words that are included in the call content information, and
    send the one or more key words to the third server device.

23. The system of claim 17, where the first server device is further to:
    identify one or more content signatures that are included in the network content,
        the one or more content signatures including an image or a sound associated with the potential event, and
    send the one or more content signatures to the third server device.

* * * * *